United States Patent
Tanaka et al.

(10) Patent No.: US 10,611,581 B2
(45) Date of Patent: Apr. 7, 2020

(54) TRANSFER APPARATUS

(71) Applicant: Azbil Corporation, Tokyo (JP)

(72) Inventors: Mitsuharu Tanaka, Tokyo (JP); Hisashi Beppu, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 16/316,480

(22) PCT Filed: Jul. 11, 2016

(86) PCT No.: PCT/JP2016/070444
§ 371 (c)(1),
(2) Date: Jan. 9, 2019

(87) PCT Pub. No.: WO2018/011859
PCT Pub. Date: Jan. 18, 2018

(65) Prior Publication Data
US 2019/0218043 A1    Jul. 18, 2019

(51) Int. Cl.
*B65G 54/02*    (2006.01)
*F16H 25/24*    (2006.01)
*H01F 7/02*    (2006.01)

(52) U.S. Cl.
CPC .............. *B65G 54/02* (2013.01); *F16H 25/24* (2013.01); *H01F 7/02* (2013.01)

(58) Field of Classification Search
CPC ........... B65G 54/02; F16H 25/24; H01F 7/02; H02K 41/033
USPC ........................................................ 198/619
See application file for complete search history.

(56) References Cited

U.S. PATENT DOCUMENTS 5,047,676 A    9/1991    Ichikawa

FOREIGN PATENT DOCUMENTS

| JP | H08-17625 A   | 1/1996 |
| JP | H10-159933 A  | 6/1998 |
| JP | 2003-028265 A | 1/2003 |
| JP | 2010-117598 A | 5/2010 |

OTHER PUBLICATIONS

International Search Report received for PCT Patent Application No. PCT/JP2016/070444, dated Sep. 20, 2016, 4 page (2 pages of English Translation of International Search Report, 2 pages of International Search Report).

*Primary Examiner* — Gene O Crawford
*Assistant Examiner* — Lester Rushin, III
(74) *Attorney, Agent, or Firm* — Amster, Rothstein & Ebenstein LLP

(57) ABSTRACT

A conveyance device equipped with a rod-shaped member that includes a magnetic body; an arc-shaped opposing member which opposes part of a side surface of the rod-shaped member and which includes a magnetic body, the opposing member including connecting surfaces which are parallel with the central axis of the rod-shaped member and which connect an outer peripheral surface and an inner peripheral surface; a drive device which rotates the rod-shaped member around the central axis of the rod-shaped member and which changes the relative positions of the rod-shaped member and the opposing member; and a conveyance member which encloses the opposing member and which has retaining surfaces that touch the connecting surfaces of the arc-shaped opposing member.

10 Claims, 12 Drawing Sheets

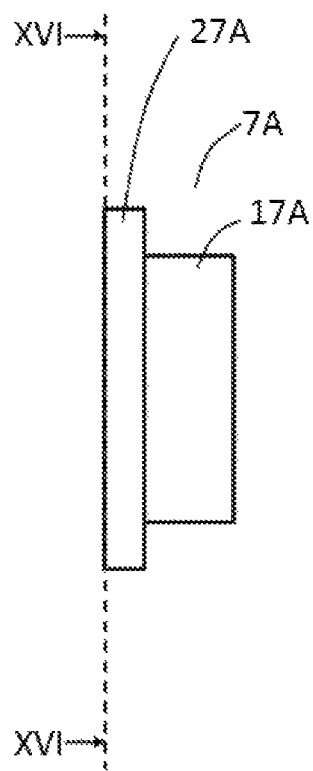
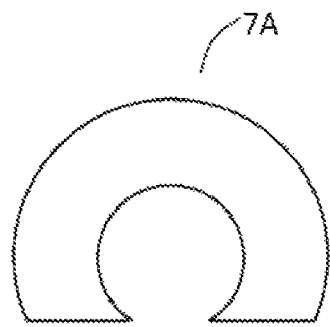
Fig. 15　　　　　　　　　　　　Fig. 16
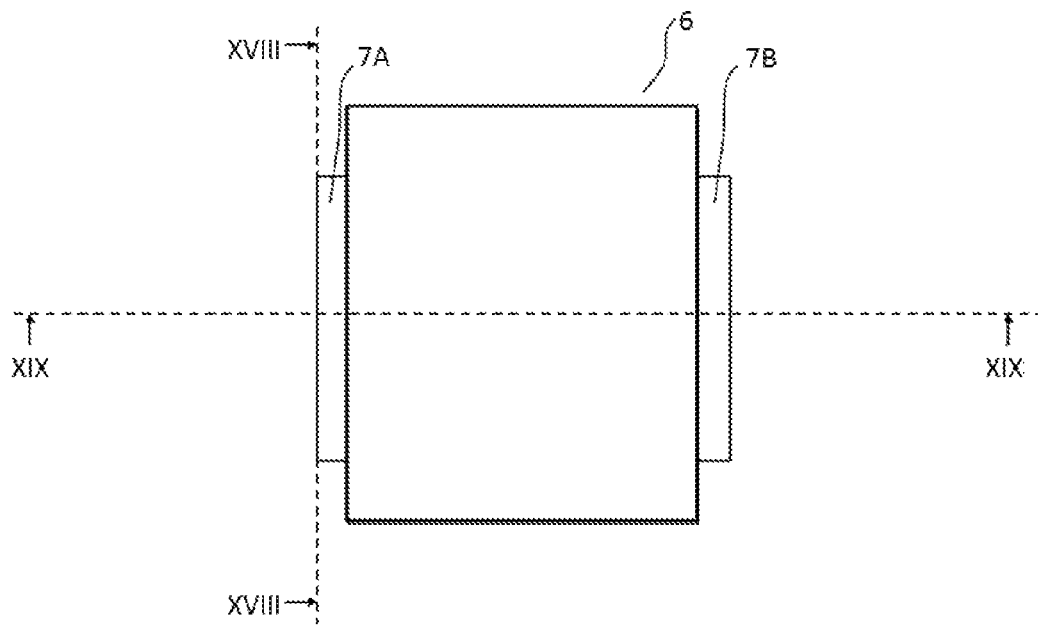
Fig. 17

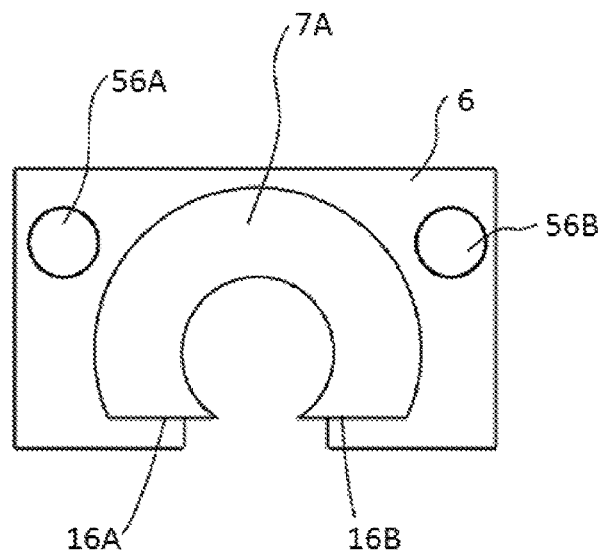
Fig. 18
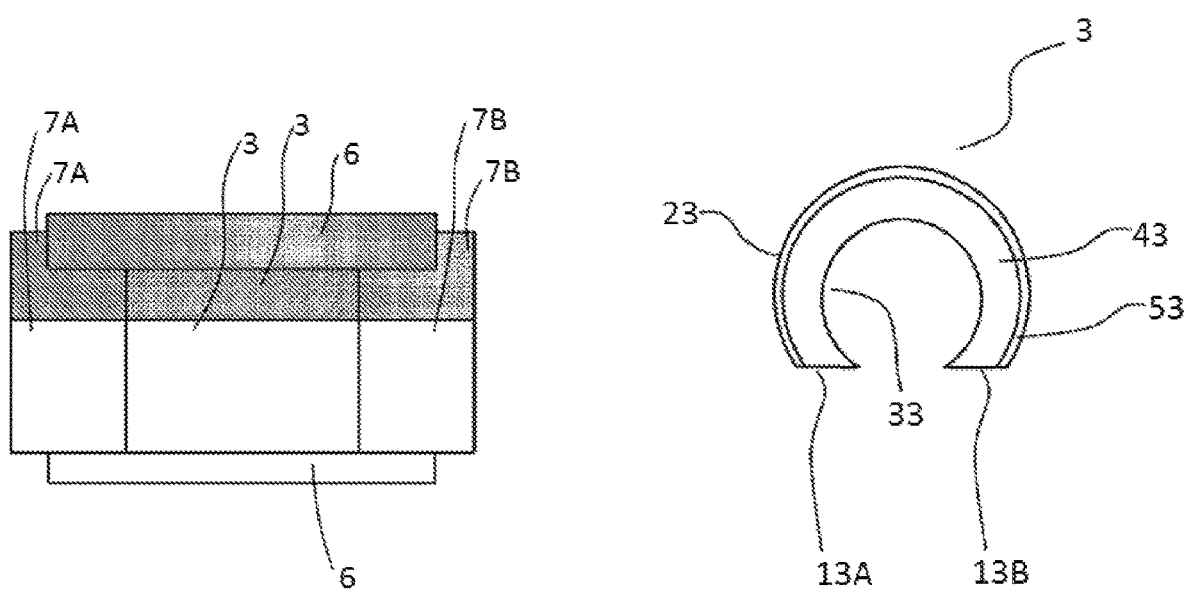
Fig. 19
Fig. 20

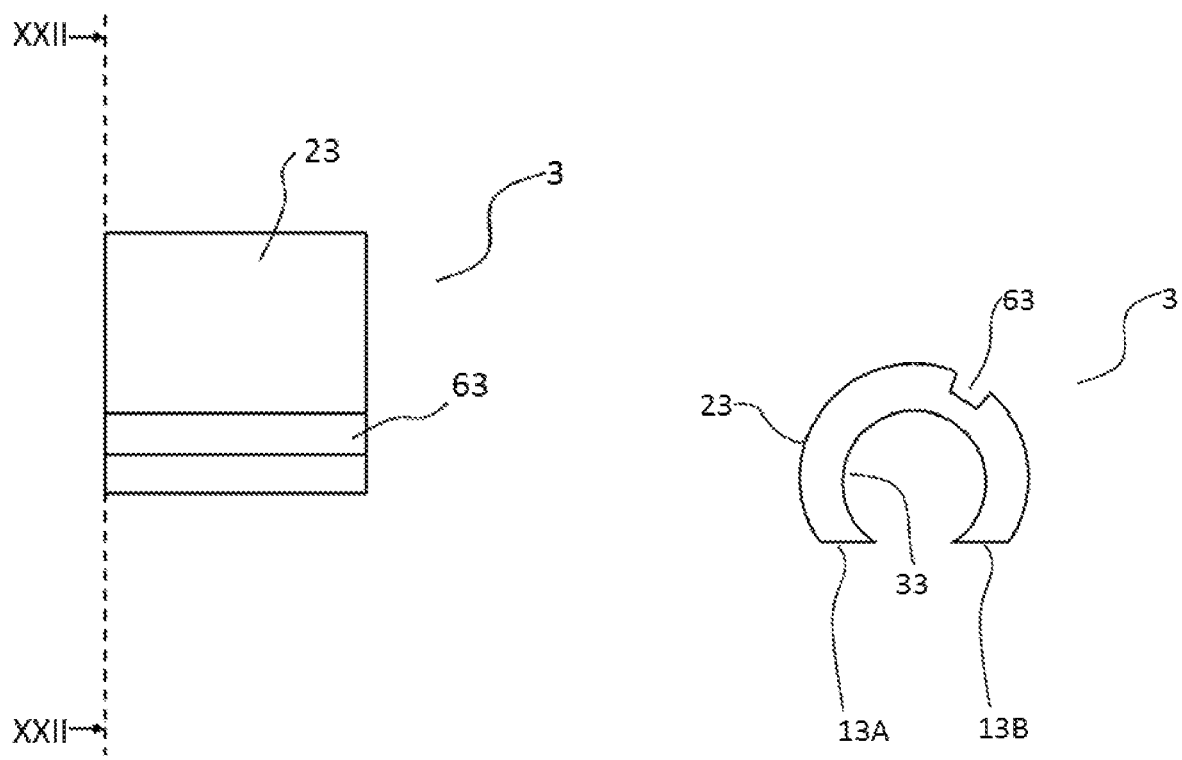
Fig. 21                                Fig. 22
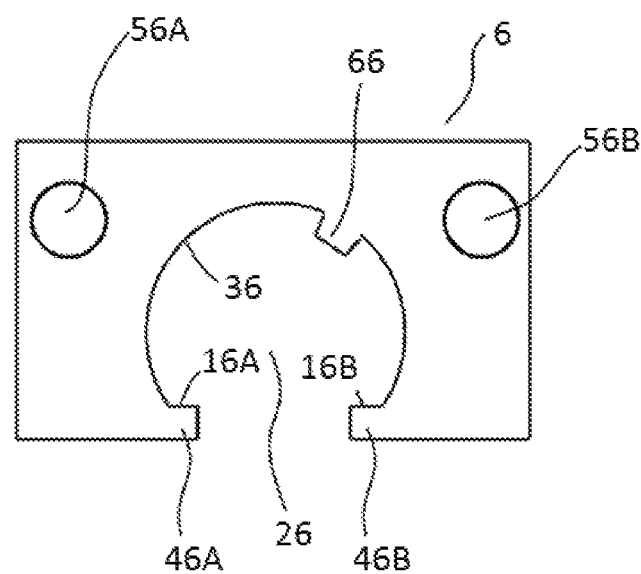
Fig. 23

TRANSFER APPARATUS

This application is a National Stage entry under 35 U.S.C. 371 of International Patent Application No. PCT/JP2016/070444, filed on Jul. 11, 2016, the entire contents of which are incorporated by reference herein.

TECHNICAL FIELD

The present invention relates to a transfer technique, more particularly to a transfer apparatus.

BACKGROUND ART

In a transfer apparatus using a magnetic screw, a male magnetic screw made of a magnetic material is rotated to move a female magnetic screw, such as a nut made of a magnetic material, in a direction of a central axis of the male magnetic screw (see, for example, PTL 1). A transfer member on which an article to be transferred is disposed is fixed to the female magnetic screw. The transfer member also moves in the direction of the central axis of the male magnetic screw together with the movement of the female magnetic screw.

When molds are used to manufacture male magnetic screws and female magnetic screws, magnets are exposed to high heat and magnetic forces thereof are reduced. Therefore, when a male magnetic screw and a female magnetic screw are manufactured, use of molds is not desirable. In addition, plastic magnets manufactured by mixing a resin material with a magnetic material and molding the mixed materials have a low magnetic force per unit area. Therefore, use of a plastic magnet for a transfer apparatus is also not desirable.

CITATION LIST

Patent Literature

PTL 1: JP-A-9-317840

SUMMARY OF INVENTION

Technical Problem

One object of the invention is to provide a transfer apparatus in which a member comprising a magnetic material can be easily fixed to a transfer member.

Solution to Problem

According to an aspect of the invention, there is provided a transfer apparatus comprising (a) a rod-shaped member that comprises a magnetic material; (b) an arc-shaped opposite member that is opposed to a part of a side surface of the rod-shaped member, comprises a magnetic material, and has a connection surface that makes connection between an outer peripheral surface and an inner peripheral surface; (c) a driving device configured to rotate the rod-shaped member about a central axis of the rod-shaped member to change a relative position between the rod-shaped member and the opposite member; and (d) a transfer member that has the opposite member therein and has a holding surface that makes contact with the connection surface of the arc-shaped opposite member.

In the transfer apparatus described above, the connection surface of the opposite member may be parallel with the central axis of the rod-shaped member.

In the transfer apparatus described above, the transfer member may have an inner wall that makes contact with the outer peripheral surface of the opposite member.

The transfer apparatus described above may further comprise a fixing member that is fixed to the transfer member so as to make contact with an end surface of the opposite member.

In the transfer apparatus described above, the opposite member may comprise a magnetic material member that has the inner peripheral surface and a cover that has the outer peripheral surface and covers the magnetic material member. The cover may be made of a ferromagnetic material.

In the transfer apparatus described above, a concave portion may be provided in the outer peripheral surface of the opposite member and a projection that engages with the concave portion provided in the outer peripheral surface of the opposite member may be provided on the transfer member.

The transfer apparatus described above may further comprise a guide configured to allow the transfer member to move in a direction of the central axis of the rod-shaped member and prevent the transfer member from rotating.

In the transfer apparatus described above, the transfer member may have a through-hole and the guide may pass through the through-hole of the transfer member.

In the transfer apparatus described above, the guide may be a rail and the transfer member may have a wheel that engages with the rail.

Advantageous Effects of Invention

According to the invention, it is possible to provide a transfer apparatus in which the member comprising magnetic material can be easily fixed to the transfer member.

BRIEF DESCRIPTION OF THE DRAWINGS

FIG. 15 is a schematic plan view illustrating a fixing member according to the second embodiment of the invention.

FIG. 16 is a schematic side view illustrating the fixing member according to the second embodiment of the invention, seen along direction XVI-XVI in FIG. 15.

FIG. 17 is a schematic plan view illustrating a transfer member into which an opposite member and the fixing member according to the second embodiment of the invention have been inserted.

FIG. 18 is a schematic side view illustrating the transfer member into which the opposite member and the fixing member according to the second embodiment of the invention have been inserted, seen along direction XVIII-XVIII in FIG. 17.

FIG. 19 is a schematic cross-sectional view illustrating the transfer member into which the opposite member and the fixing member according to the second embodiment of the invention have been inserted, seen along direction XIX-XIX in FIG. 17.

FIG. 20 is a schematic side view illustrating an opposite member according to a third embodiment.

FIG. 21 is a schematic plan view illustrating an opposite member according to a fourth embodiment.

FIG. 22 is a schematic side view illustrating the opposite member according to the fourth embodiment, seen along direction XXII-XXII in FIG. 21.

FIG. 23 is a schematic side view illustrating a transfer member according to the fourth embodiment.

DESCRIPTION OF EMBODIMENTS

Figure 1:
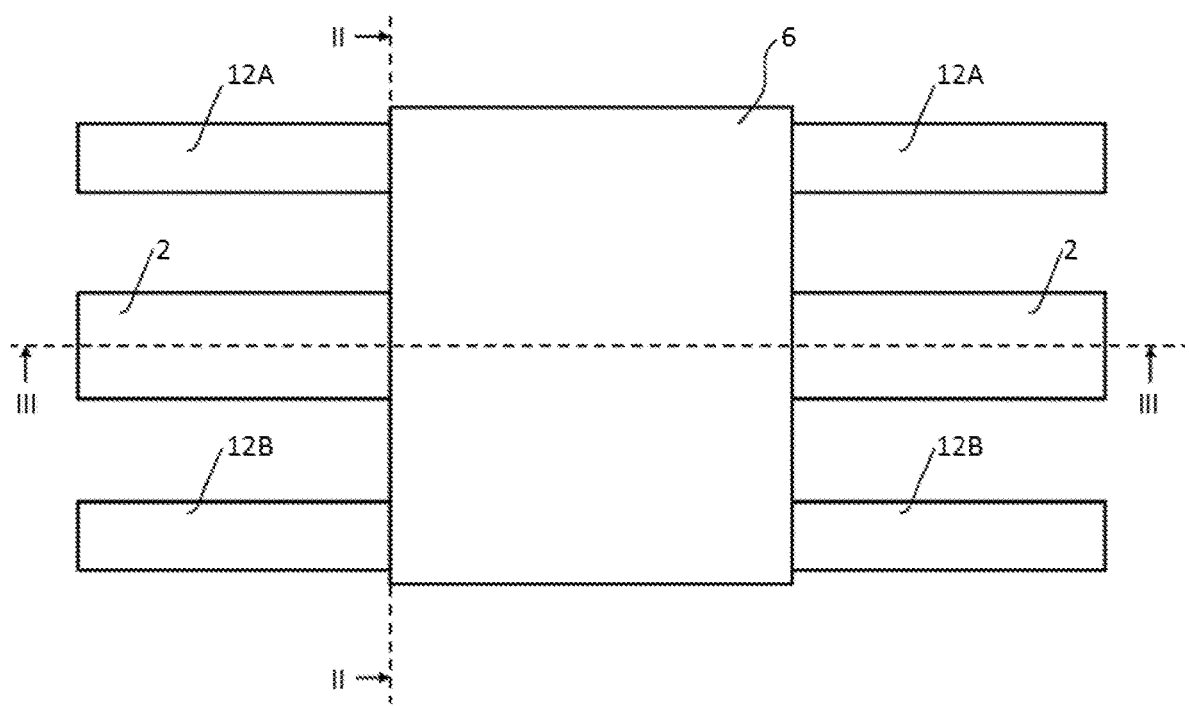
FIG. 1 is a schematic plan view illustrating a transfer apparatus according to a first embodiment of the invention.

Embodiments of the invention will be described below. In the description of the drawings given below, the same or similar parts are denoted by the same or similar reference numerals. However, the drawings are illustrated schematically. Accordingly, specific dimensions and the like should be decided with reference to the following description. It will be appreciated that the relationship or the ratio between dimensions may be different among the drawings.

(First Embodiment)

Figure 2:
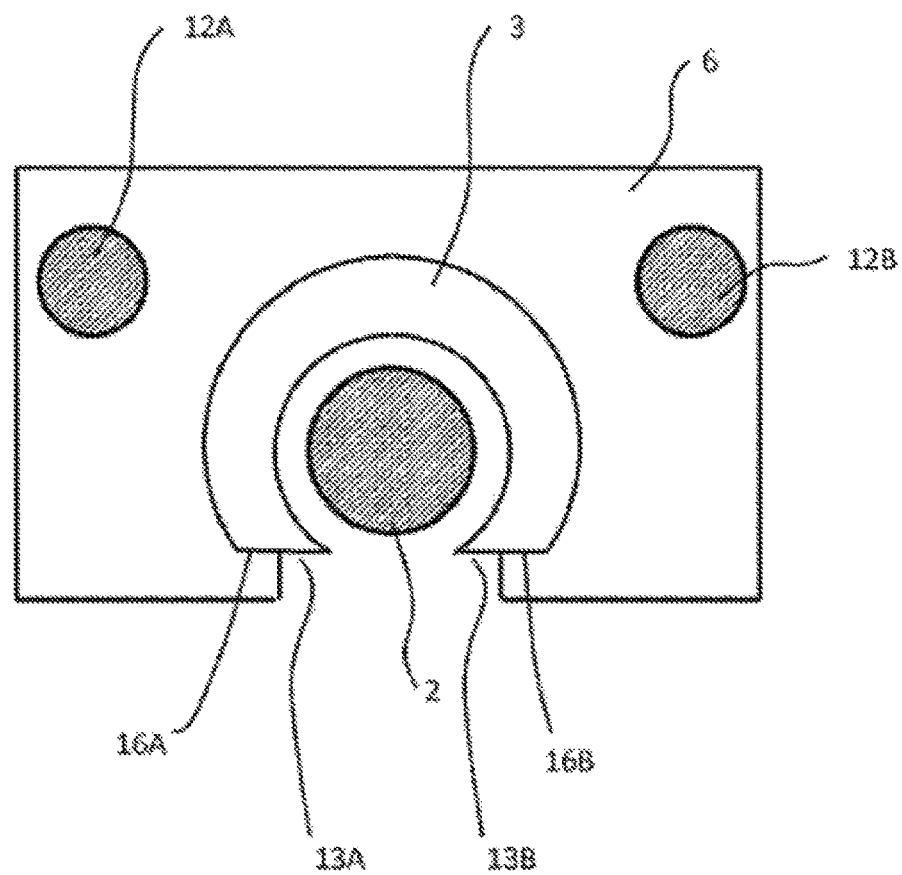
FIG. 2 is a schematic side view illustrating the transfer apparatus according to the first embodiment of the invention, seen along direction II-II in FIG. 1.
Figure 3:
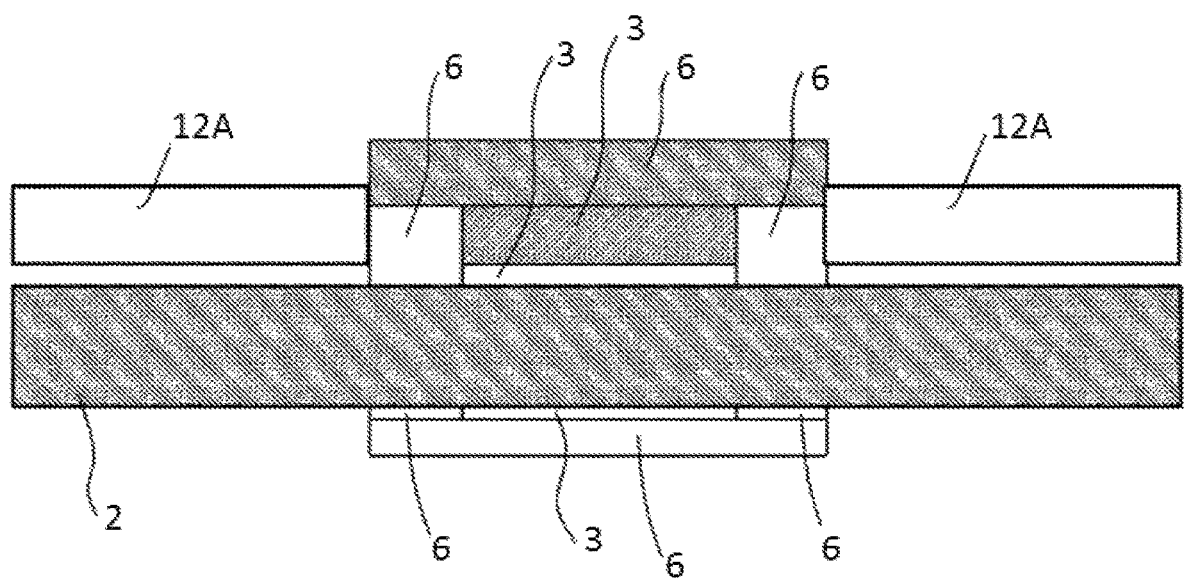
FIG. 3 is a schematic cross-sectional view illustrating the transfer apparatus according to the first embodiment of the invention, seen along direction III-III in FIG. 1.

As illustrated in FIG. 1, FIG. 2, and FIG. 3, a transfer apparatus according to a first embodiment of the invention comprises a rod-shaped member 2 that comprises a magnetic material, an arc-shaped opposite member 3 that is opposed to a part of a side surface of the rod-shaped member 2, comprises a magnetic material, and has connection surfaces 13A and 13B, parallel with a central axis of the rod-shaped member 2, that make connection between an outer peripheral surface and an inner peripheral surface, a driving device configured to rotate the rod-shaped member 2 about the central axis of the rod-shaped member 2 to change a relative position between the rod-shaped member 2 and the opposite member 3, and a transfer member 6 that has the opposite member 3 therein and has holding surfaces 16A and 16B that make contact with the connection surfaces 13A and 13B of the arc-shaped opposite member 3.

The cylindrical rod-shaped member 2 is held by, for example, a bearing. The rod-shaped member 2 is a male magnetic screw. A trapezoidal or rectangular projection made of a ferromagnetic material is provided spirally on an outer peripheral surface of the rod-shaped member 2. Alternatively, an S pole magnetized zone and an N pole magnetized zone that are permanent magnets may be alternately provided spirally on the outer peripheral surface of the rod-shaped member 2. The rod-shaped member 2 may be inserted into a thin-walled pipe made of a nonmagnetic material. The pipe is made of, for example, stainless steel. The rod-shaped member 2 and the pipe are integrated with each other and, when the rod-shaped member 2 rotates, the pipe also rotates about the central axis of the rod-shaped member 2.

Figure 4:
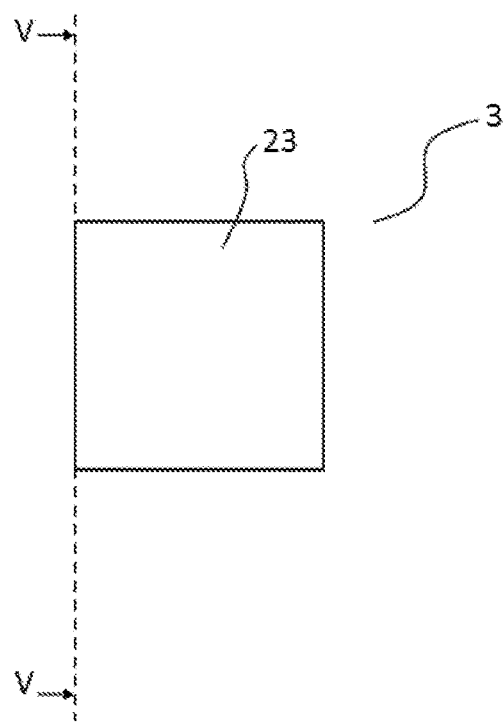
FIG. 4 is a schematic plan view illustrating an opposite member according to the first embodiment of the invention.
Figure 5:
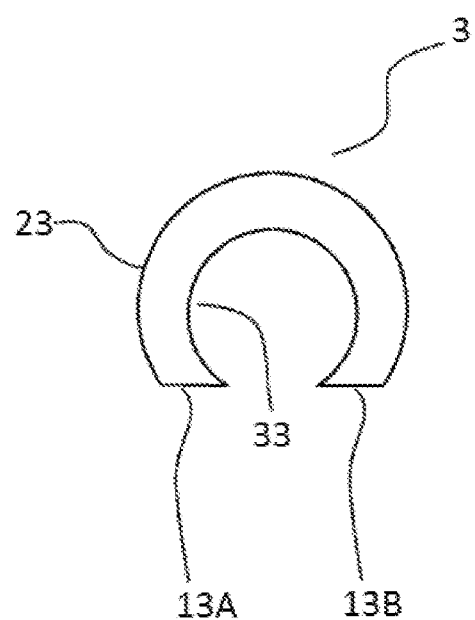
FIG. 5 is a schematic side view illustrating the opposite member according to the first embodiment of the invention, seen along direction V-V in FIG. 4.

As illustrated in FIG. 4 and FIG. 5, the arc-shaped opposite member 3 is formed by removing a part of a cylindrical side wall from one end portion to the other end portion in the longitudinal direction. Accordingly, the arc-shaped opposite member 3 comprises an outer peripheral surface 23, an inner peripheral surface 33, and the connection surfaces 13A and 13B that make connections between the outer peripheral surface 23 and the inner peripheral surface 33. The cross-section of the outer peripheral surface 23 and the cross-section of the inner peripheral surface 33 are arc-shaped. The opposite member 3 is a magnetic nut comprising a hard magnetic material and the inner periphery of the opposite member 3 is larger than the outer periphery of the rod-shaped member 2. As illustrated in FIG. 2 and FIG. 3, the rod-shaped member 2 passes inside the nut-shaped opposite member 3. An S pole magnetized zone and an N pole magnetized zone that are permanent magnets are alternately provided spirally on the inner peripheral surface 33 of the hole of the opposite member 3. The pitch of the magnetized zones of the opposite member 3 is substantially the same as the pitch of the magnetized zones of the rod-shaped member 2.

Figure 6:
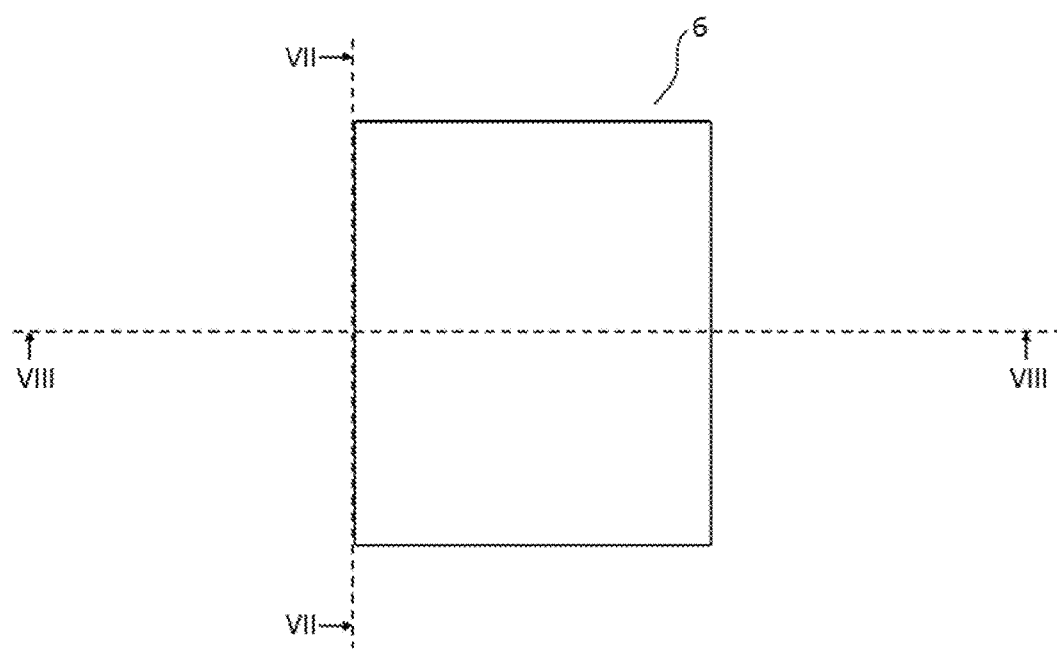
FIG. 6 is a schematic plan view illustrating a transfer member according to the first embodiment of the invention.
Figure 7:
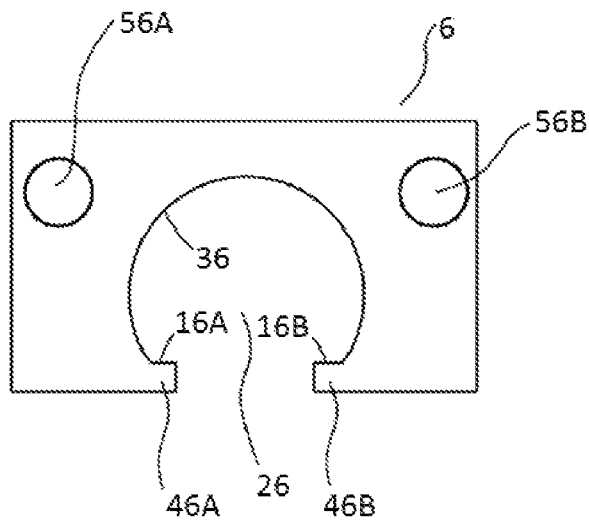
FIG. 7 is a schematic side view illustrating the transfer member according to the first embodiment of the invention, seen along direction VII-VII in FIG. 6.
Figure 8:
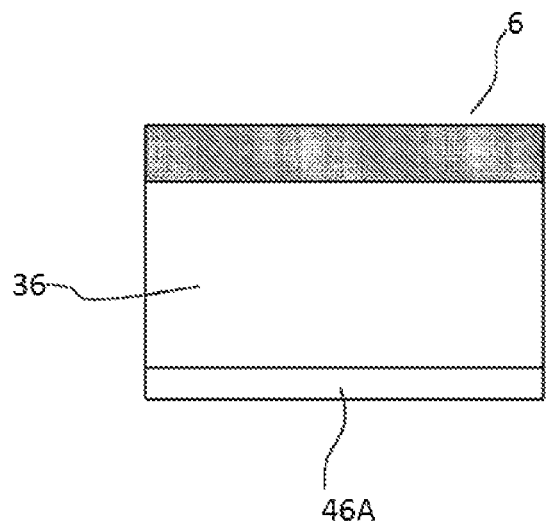
FIG. 8 is a schematic cross-sectional view illustrating the transfer member according to the first embodiment of the invention, seen along direction VIII-VIII in FIG. 6.

As illustrated in FIG. 6, FIG. 7, and FIG. 8, the transfer member 6 has, for example, a rectangular parallelepiped shape having a concave portion 26 on a bottom surface. However, the transfer member 6 has any outside shape. An article to be transferred or the like is disposed on the transfer member 6. Alternatively, the transfer member 6 makes contact with and pushes the article to be transferred or the like. At least a part of an inner wall 36 of the concave portion 26 of the transfer member 6 has a shape that makes contact with the outer peripheral surface 23 of the opposite member 3 illustrated in FIG. 5. As illustrated in FIG. 7 and FIG. 8, steps 46A and 46B are provided on the inner wall 36 of the concave portion 26 of the transfer member 6. The steps 46A and 46B may be integrated with other parts of the transfer member 6. An upper surface of the step 46A makes contact with the connection surface 13A of the opposite member 3 illustrated in FIG. 5 and functions as the holding surface 16A that holds the opposite member 3. In addition, an upper surface of the step 46B illustrated in FIG. 7 makes contact with the connection surface 13B of the opposite member 3 illustrated in FIG. 5 and functions as the holding surface 16B that holds the opposite member 3.

In addition, as illustrated in FIG. 7, the transfer member 6 has through-holes 56A and 56B into which rod-shaped linear guides 12A and 12B illustrated in FIG. 1 are inserted. The through-holes 56A and 56B are provided in parallel with the direction of the central axis of the rod-shaped member 2. The transfer member 6 is made of, for example, metal. The linear guides 12A and 12B illustrated in FIG. 1, FIG. 2, and FIG. 3 function as guides that allow the transfer member 6 to move in the direction of the central axis of the rod-shaped member 2 and prevent the transfer member 6 from rotating.

Figure 9:
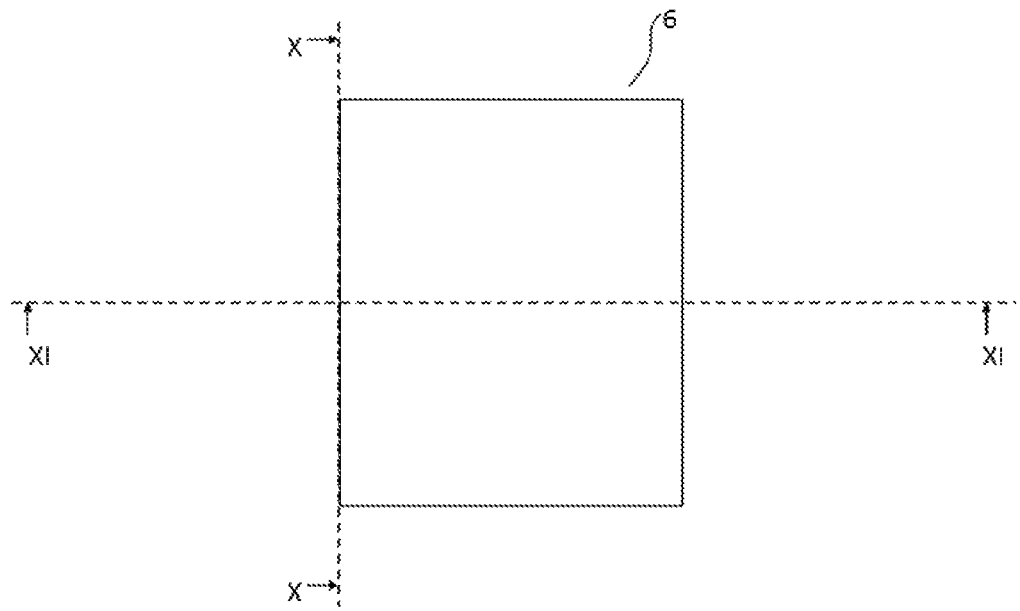
FIG. 9 is a schematic plan view illustrating the transfer member into which the opposite member according to the first embodiment of the invention has been inserted.
Figure 10:
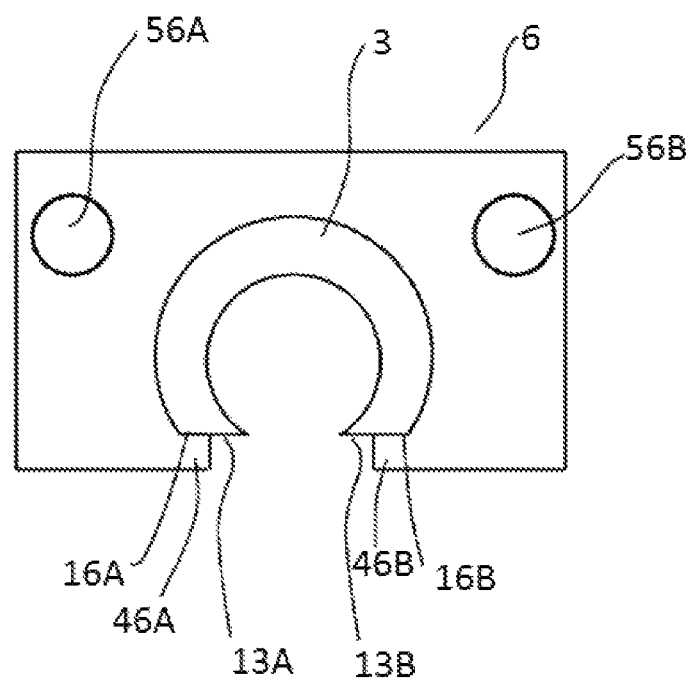
FIG. 10 is a schematic side view illustrating the transfer member into which the opposite member according to the first embodiment of the invention has been inserted, seen along direction X-X in FIG. 9.
Figure 11:
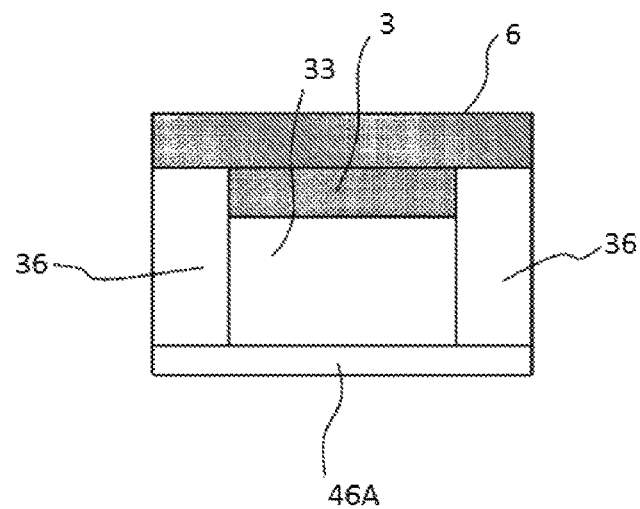
FIG. 11 is a schematic cross-sectional view illustrating the transfer member into which the opposite member according to the first embodiment of the invention has been inserted, seen along direction XI-XI in FIG. 9.

When the transfer apparatus according to the first embodiment is assembled, the opposite member 3 is inserted into the concave portion 26 of the transfer member 6 as illustrated in FIG. 9, FIG. 10, and FIG. 11. The outer peripheral surface 23 of the opposite member 3 illustrated in FIG. 5 makes contact with and engages with the inner wall 36 of the concave portion 26 of the transfer member 6 illustrated in FIG. 7. In addition, the connection surfaces 13A and 13B of the opposite member 3 illustrated in FIG. 5 make contact with and engage with the holding surfaces 16A and 16B of the transfer member 6 illustrated in FIG. 7, respectively. This prevents the opposite member 3 from rotating about the center of arcs of the cross-sections of the outer peripheral surface 23 and the inner peripheral surface 33 inside the transfer member 6.

Next, as illustrated in FIG. 1, FIG. 2, and FIG. 3, the linear guides 12A and 12B are inserted into the through-holes 56A and 56B of the transfer member 6. In addition, the linear guides 12A and 12B are fixed so as not to move. This enables the movement of the transfer member 6 in the direction of the long axes of the linear guides 12A and 12B and prevents the movement of the transfer member 6 in the direction orthogonal to the long axes of the linear guides 12A and 12B and the rotation of the transfer member 6. In addition, the rod-shaped member 2 is passed through the hollow portion of the opposite member 3 and the rod-shaped member 2 is rotatably held by a bearing or the like. The center of the circle in the cross-section of the rod-shaped member 2 coincides with the center of the arcs in the cross-sections of the outer peripheral surface 23 and the inner peripheral surface 33 of the opposite member 3. In addition, a driving device is connected to one end or the like of the rod-shaped member 2. The disposition of the driving device is fixed and the rod-shaped member 2 connected to the driving device cannot move in the direction of the central axis thereof.

When the rod-shaped member 2 is rotated by the driving device after assembly, a magnetic force acts between the magnetized zone of the rod-shaped member 2 and the magnetized zone of the opposite member 3. Since the opposite member 3 is held by the transfer member 6 and the rotation of the transfer member 6 is prevented by the linear guides 12A and 12B, the opposite member 3 cannot rotate. Therefore, when the rod-shaped member 2 is rotated, the opposite member 3 moves along the central axis of the rod-shaped member 2 and the transfer member 6 also moves with the movement of the opposite member 3.

Since a sintered magnet or the like is easily broken by receiving a large force, it is preferable not to fix the opposite member 3 to the transfer member 6 by press-fitting or screws. In addition, when the transfer apparatus is used in a clean room or the like or when the transfer apparatus is used to transfer articles captured in human bodies, such as foods or medicines, it is preferable not to secure the opposite member 3 to the transfer member 6 with an adhesive. This is because a part of an adhesive may change to powder and scatter due to aged deterioration or temperature changes, be attached to the article transferred by the transfer apparatus as a foreign matter, and adversely affect the article.

In contrast, in the transfer apparatus according to the first embodiment, the connection surfaces 13A and 13B of the opposite member 3 make contact with the holding surfaces 16A and 16B of the transfer member 6. Therefore, when the rod-shaped member 2 rotates, a rotating force is applied to the opposite member 3 and thus the transfer member 6. However, since the transfer member 6 is prevented from rotating by the linear guides 12A and 12B, the rotation of the opposite member 3 is blocked by a coupling surface between the connection surfaces 13A and 13B and the holding surfaces 16A and 16B. Accordingly, the opposite member 3 can be prevented from rotating without securing the opposite member 3 to the transfer member 6 by press-fitting, screws, or an adhesive.

(Second Embodiment)

Figure 12:
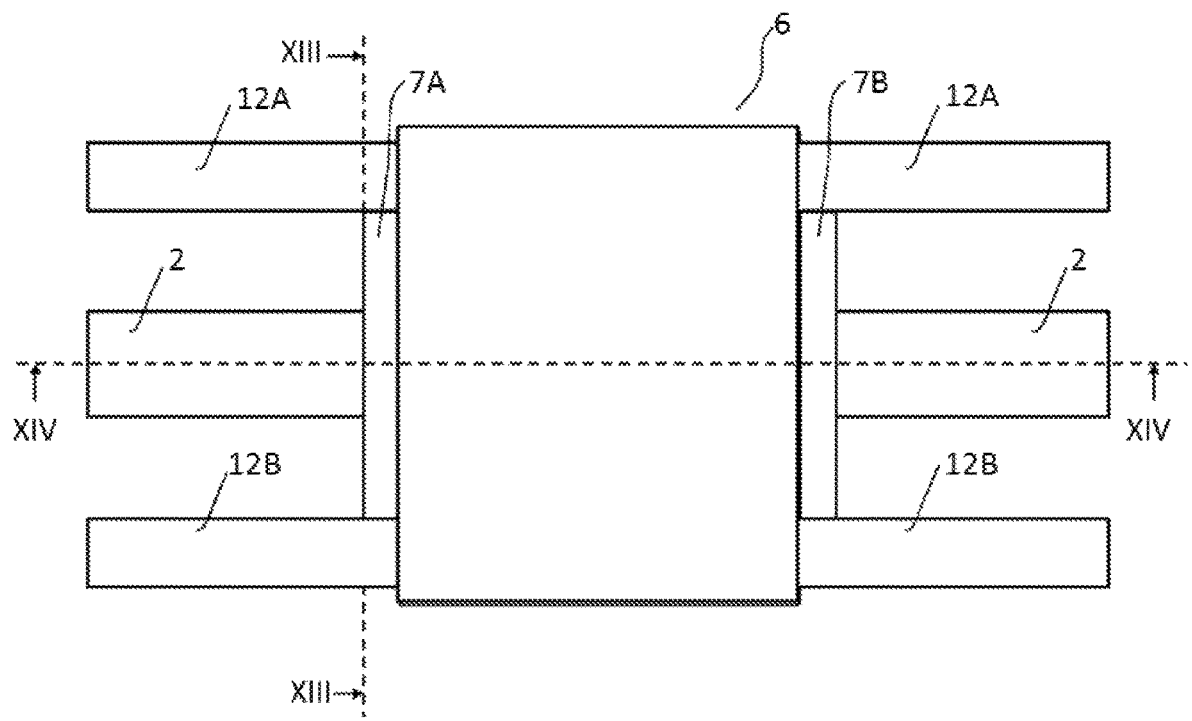
FIG. 12 is a schematic plan view illustrating a transfer apparatus according to a second embodiment of the invention.
Figure 13:
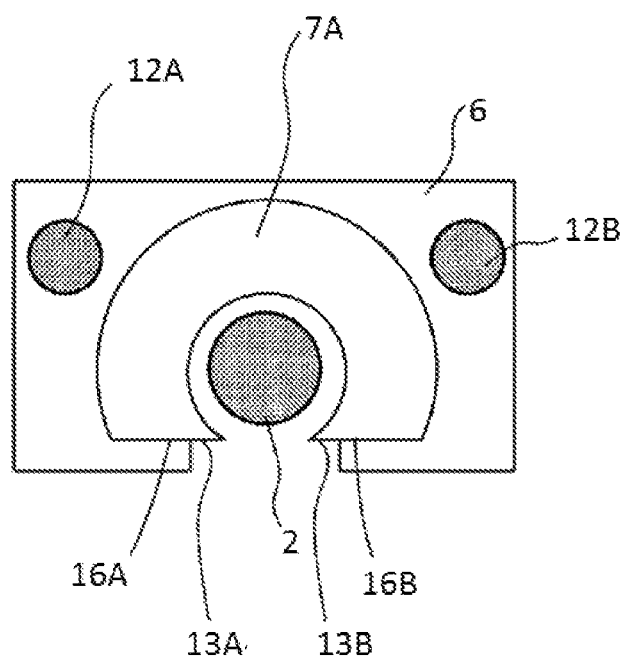
FIG. 13 is a schematic side view illustrating the transfer apparatus according to the second embodiment of the invention, seen along direction XIII-XIII in FIG. 12.
Figure 14:
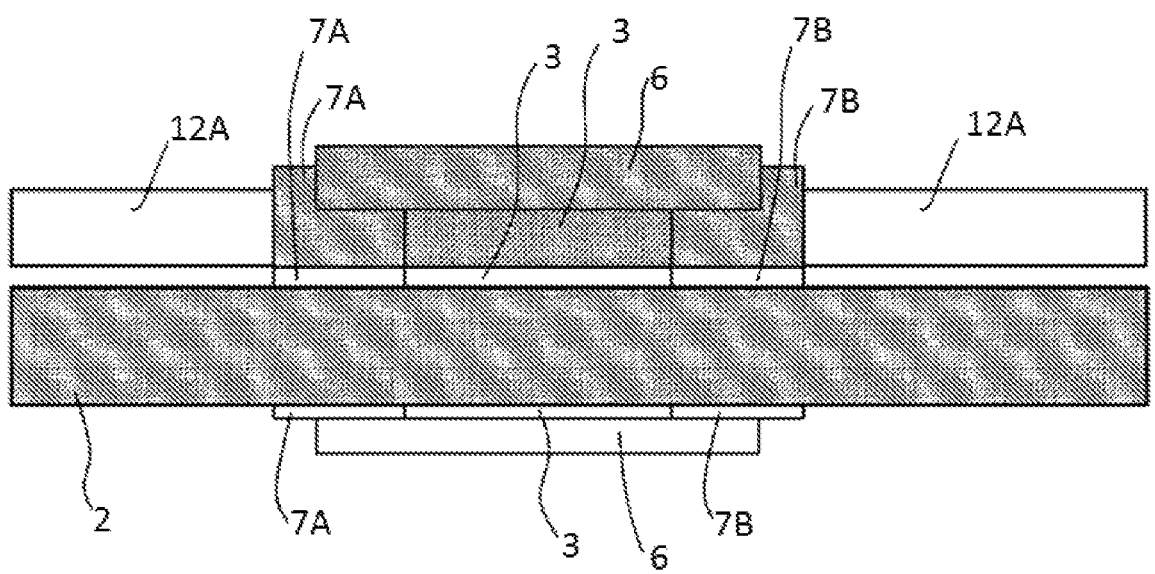
FIG. 14 is a schematic cross-sectional view illustrating the transfer apparatus according to the second embodiment of the invention, seen along direction XIV-XIV in FIG. 12.
Figure 24A:
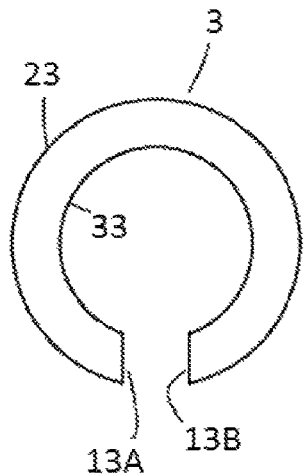
FIGS. 24a, 24b, 24c, and 24d are schematic side views illustrating opposite members according to other embodiments.
Figure 24B:
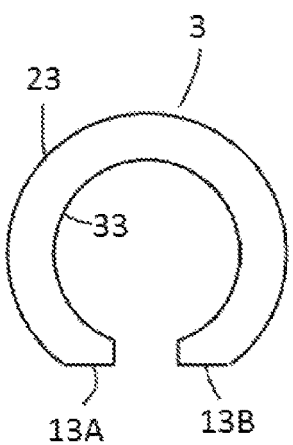
Figure 24C:
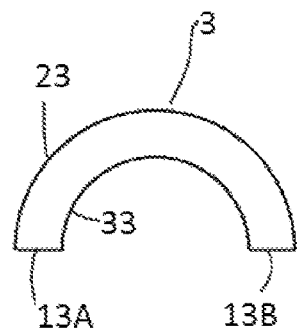
Figure 24D:
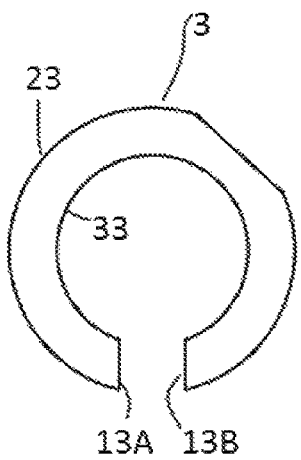

A transfer apparatus according to a second embodiment further comprises fixing members 7A and 7B fixed to the transfer member 6 so as to make contact with the end surfaces of the opposite member 3 as illustrated in FIG. 12, FIG. 13, and FIG. 14. The other components of the transfer apparatus according to the second embodiment are the same as those of the first embodiment.

As illustrated in FIG. 15 and FIG. 16, the fixing member 7A has an insertion portion 17A that is inserted into the concave portion 26 of the transfer member 6 and has an end surface making contact with the opposite member 3 and a flange portion 27A, making contact with a side surface of the transfer member 6, that is connected to the insertion portion 17A. For example, the cross-section of the insertion portion 17A of the fixing member 7A has the same shape as the cross-section of the opposite member 3 and the insertion portion 17A comprises an outer peripheral surface, an inner peripheral surface, and a connection surface that makes contact between the outer peripheral surface and the inner peripheral surface. The cross-section of the outer peripheral surface and the cross-section of the inner peripheral surface are arc-shaped. The fixing member 7B has the same shape as the fixing member 7A. The fixing members 7A and 7B are made of, for example, metal or the like.

When the transfer apparatus according to the second embodiment is assembled, the opposite member 3 is inserted into the concave portion 26 of the transfer member 6 as in the first embodiment. Next, as illustrated in FIG. 17, FIG. 18, and FIG. 19, the fixing members 7A and 7B are inserted into the concave portion 26 of the transfer member 6 so as to sandwich the opposite member 3. The outer peripheral surfaces of the fixing members 7A and 7B make close contact with and engage with the inner wall 36 of the concave portion 26 of the transfer member 6. In addition, the connection surfaces of the fixing members 7A and 7B make close contact with and engage with the holding surfaces 16A and 16B of the transfer member 6. In addition, the end surface of the insertion portion 17A of the fixing member 7A makes contact with one end surface of the opposite member 3 and an end surface of an insertion portion 17B of the fixing member 7B makes contact with the other end surface of the opposite member 3.

The fixing members 7A and 7B are press-fitted into the concave portion 26 of the transfer member 6 so as not to move in the direction of the central axis of the rod-shaped member 2. Therefore, the outer dimensions of the insertion portions of the fixing members 7A and 7B may be slightly larger than the outer dimensions of the opposite member 3. Alternatively, the flange portions of the fixing members 7A and 7B (e.g., flange portion 27 of fixing member 7A) may be secured to the side surfaces of the transfer member 6 by screws.

When the rod-shaped member 2 illustrated in FIG. 12, FIG. 13, and FIG. 14 is rotated, the opposite member 3 moves in the direction of the central axis of the rod-shaped member 2 and the transfer member 6 moves together with the opposite member 3 by a friction force. The fixing members 7A and 7B suppress a deviation of the movement of the transfer member 6 with respect to the movement of the opposite member 3. It should be noted here that only one of the fixing members 7A and 7B may be fixed to the transfer member 6. Alternatively, one of the fixing members 7A and 7B may be integrated with the transfer member 6. In this case, the opposite member 3 is inserted into the transfer member 6 from the side with which the fixing member is not integrated.

(Third Embodiment)

In a transfer apparatus according to a third embodiment, as illustrated in FIG. 20, the opposite member 3 has a magnetic material member 43 having the inner peripheral surface 33 and a cover 53 having the outer peripheral surface 23 and covering the magnetic material member 43. As described in the first embodiment, the S pole magnetized zone and the N pole magnetized zone that are permanent magnets are alternately provided spirally on the inner peripheral surface 33. The cover 53 is made of, for example, a ferromagnetic material. The cover 53 improves the magnetic force between the opposite member 3 and the rod-shaped member 2 by causing a magnetic flux from the inner peripheral surface 33 to the outer peripheral surface 23 to flow back to the inner peripheral surface 33. The other components of the transfer apparatus according to the third embodiment are the same as those of the first or second embodiment.

(Fourth Embodiment)

In a transfer apparatus according to a fourth embodiment, a concave portion 63 is provided in the outer peripheral surface 23 of the opposite member 3 as illustrated in FIG. 21 and FIG. 22 and a projection 66 that engages with the concave portion 63 provided in the outer peripheral surface 23 of the opposite member 3 is provided on the transfer member 6 as illustrated in FIG. 23. As illustrated in FIG. 22, the concave portion 63 provided in the outer peripheral surface 23 of the opposite member 3 does not need to reach the inner peripheral surface 33. The opposite member 3 can be fixed to the transfer member 6 more certainly by engaging the concave portion 63 with the projection 66. The other components of the transfer apparatus according to the fourth embodiment are the same as those of the first, second, or third embodiment.

(Other Embodiments)

Figure 25:
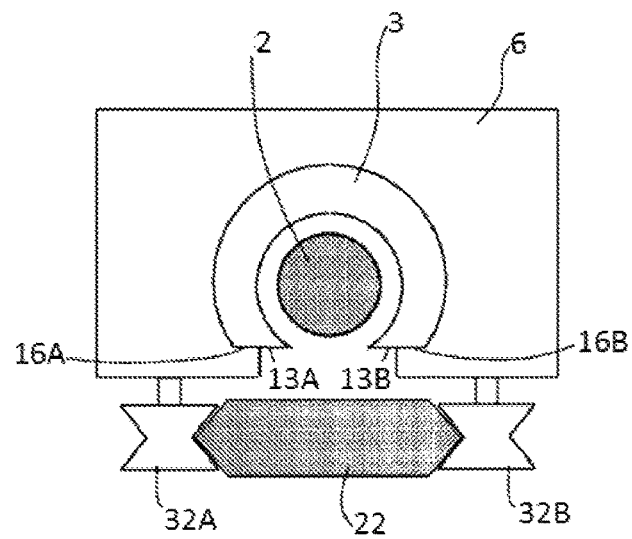
FIG. 25 is a schematic side view illustrating a transfer apparatus according to another embodiment.
Figure 26:
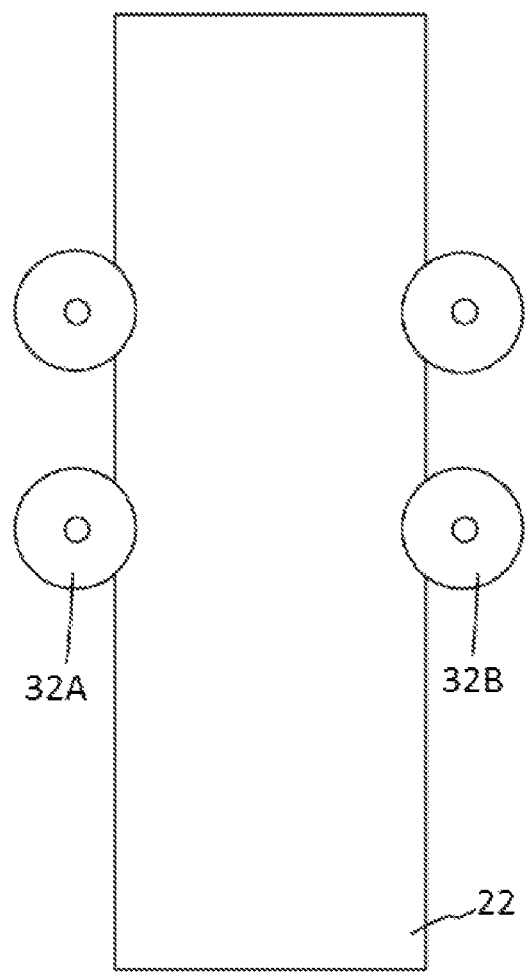
FIG. 26 is a schematic plan view illustrating a rail and a wheel according to another embodiment.

Although the invention has been described by embodiments as described above, it should not be understood that the description and the drawings that are parts of the disclosure limit the invention. It must be apparent to those skilled in the art that various alternative embodiments, examples, and operational techniques are clarified based on the disclosure. For example, an example in which the linear guides passing through the transfer member are used has been described in the embodiments. However, the member that holds the transfer member so that the transfer member can move in the direction of the central axis of the rod-shaped member and cannot rotate is not limited to the linear guides that pass through the transfer member. For example, as illustrated in FIG. 25 and FIG. 26, the transfer member 6 may be held so that the transfer member 6 can move in the direction of the central axis of the rod-shaped member 2 and cannot rotate by providing a guide, such as a rail 22, that has a hexagonal cross-section and has a V-shaped projection on the side thereof on a board and providing guide followers, such as wheels 32A and 32B, that have V-shaped grooves engaging with the both sides of the rail 22 on the bottom surface of the transfer member. The rail 22 extends in parallel with the direction of the central axis of the rod-shaped member 2. In addition, the opposite member 3 may have various shapes as illustrated in FIGS. 24a, 24b, 24c, and 24d. As described above, it should be understood that the invention encompasses various embodiments and the like not described in the description.

REFERENCE SIGNS LIST

2: rod-shaped member
3: opposite member
6: transfer member
7A, 7B: fixing member
12A, 12B: linear guide
13A, 13B: connection surface
16A, 16B: holding surface
17A, 17B: insertion portion
22: rail
23: outer peripheral surface
26: concave portion
27A: flange portion
32A, 32B: wheel
33: inner peripheral surface
36: inner wall
43: magnetic material member
46A, 46B: step
53: cover
56A, 56B: through-hole
63: concave portion
66: projection

The invention claimed is:

1. A transfer apparatus comprising:
   a rod-shaped member that comprises a magnetic material;
   an arc-shaped opposite member that is opposed to a part of a side surface of the rod-shaped member, comprises a magnetic material, and has a connection surface that makes connection between an outer peripheral surface and an inner peripheral surface;
   a driving device configured to rotate the rod-shaped member about a central axis of the rod-shaped member to change a relative position between the rod-shaped member and the opposite member; and
   a transfer member that has the arc-shaped opposite member therein and has a holding surface that makes contact with the connection surface of the arc-shaped opposite member.

2. The transfer apparatus according to claim 1, wherein the connection surface of the arc-shaped opposite member is parallel with the central axis of the rod-shaped member.

3. The transfer apparatus according to claim 1, wherein the transfer member has an inner wall that makes contact with the outer peripheral surface of the arc-shaped opposite member.

4. The transfer apparatus according to claim 1, further comprising a fixing member that is fixed to the transfer member so as to make contact with an end surface of the arc-shaped opposite member.

5. The transfer apparatus according to claim 1,
wherein the arc-shaped opposite member comprises a magnetic material member that has the inner peripheral surface and a cover that has the outer peripheral surface and covers the magnetic material member.

6. The transfer apparatus according to claim 5,
wherein the cover is made of a ferromagnetic material.

7. The transfer apparatus according to claim 1,
wherein a concave portion is provided in the outer peripheral surface of the arc-shaped opposite member, and
a projection that engages with the concave portion provided in the outer peripheral surface of the arc-shaped opposite member is provided on the transfer member.

8. The transfer apparatus according to claim 1, further comprising a guide configured to allow the transfer member to move in a direction of the central axis of the rod-shaped member and prevent the transfer member from rotating.

9. The transfer apparatus according to claim 8,
wherein the transfer member has a through-hole and the guide passes through the through-hole of the transfer member.

10. The transfer apparatus according to claim 8,
wherein the guide is a rail and the transfer member has a wheel that engages with the rail.

* * * * *